United States Patent
Abaeian et al.

(10) Patent No.: US 12,264,592 B2
(45) Date of Patent: Apr. 1, 2025

(54) LOCAL VIBRATION DAMPING FOR GAS TURBINE ENGINE HOUSING

(71) Applicant: Pratt & Whitney Canada Corp., Longueuil (CA)

(72) Inventors: Negin Abaeian, Westmount (CA); Morgan Demenois, Montreal (CA); Tomasz Olech, Rzeszow (PL); Raghavendra Pendyala, Montreal (CA); Domenico Di Florio, Saint Lazare (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/348,903

(22) Filed: Jul. 7, 2023

(65) Prior Publication Data
US 2025/0012203 A1    Jan. 9, 2025

(51) Int. Cl.
*F01D 25/04* (2006.01)
*F04D 29/66* (2006.01)
*F16F 15/02* (2006.01)
*F02C 7/20* (2006.01)

(52) U.S. Cl.
CPC .......... *F01D 25/04* (2013.01); *F04D 29/668* (2013.01); *F16F 15/02* (2013.01); *F02C 7/20* (2013.01); *F05D 2240/14* (2013.01); *F05D 2260/96* (2013.01)

(58) Field of Classification Search
CPC ............. F05D 2260/96; F05D 2240/14; F04D 29/668; F16F 15/02; F01D 25/04
See application file for complete search history.

(56) References Cited

U.S. PATENT DOCUMENTS

| | | | |
|---|---|---|---|
| 5,681,142 A | 10/1997 | Lewis | |
| 10,385,730 B2 | 8/2019 | Acius et al. | |
| 11,428,120 B1 * | 8/2022 | Girard | F01D 9/065 |
| 12,091,980 B1 * | 9/2024 | Smoke | F01D 11/18 |
| 2008/0069688 A1 * | 3/2008 | Harper | F02K 3/06 |
| | | | 415/196 |

(Continued)

FOREIGN PATENT DOCUMENTS

GB        856670 A    12/1960

OTHER PUBLICATIONS

European Search Report for EP Application No. 24187198.7 dated Nov. 26, 2024.

*Primary Examiner* — Todd E Manahan
*Assistant Examiner* — Rene D Ford
(74) *Attorney, Agent, or Firm* — Carlson, Gaskey & Olds, P.C.

(57) ABSTRACT

A gas turbine engine includes a compressor section, a combustor and a turbine section. At least one casing surrounds at least one of the compressor and turbine section. The at least one casing is formed of sheet metal. The at least one casing has at least one potential peak displacement point due to vibration across a speed range of the one of the compressor and turbine section. A damper is placed on the casing at the at least one potential peak displacement point. The damper has one end fixed to the casing, and a second end not fixed to the casing and the second end provides an interference fit such that the second end cannot move to a relaxed position of the second end due to the wall of the casing. A method is also disclosed.

10 Claims, 3 Drawing Sheets

(56) References Cited

U.S. PATENT DOCUMENTS

| | | | |
|---|---|---|---|
| 2008/0115484 | A1 | 5/2008 | Conete et al. |
| 2013/0092489 | A1* | 4/2013 | Hagelin ................. B64D 29/00 |
| | | | 188/379 |
| 2013/0110476 | A1* | 5/2013 | Delvaux ................. G01M 7/00 |
| | | | 703/2 |
| 2014/0003922 | A1 | 1/2014 | Daniels et al. |
| 2014/0096537 | A1 | 4/2014 | McMahon |
| 2016/0208640 | A1 | 7/2016 | Drozdz |
| 2018/0135456 | A1* | 5/2018 | Flavin ................. G05B 23/0216 |
| 2018/0209298 | A1* | 7/2018 | Binsberger .............. F01D 25/24 |
| 2018/0209345 | A1* | 7/2018 | Fulayter .................... F02C 7/24 |
| 2018/0258853 | A1* | 9/2018 | Marchaj ................. F02C 7/045 |
| 2020/0263566 | A1 | 8/2020 | Smedresman et al. |
| 2021/0071547 | A1 | 3/2021 | McGivern et al. |
| 2021/0148246 | A1* | 5/2021 | Thirumalasetty ....... F01D 17/08 |
| 2022/0120218 | A1* | 4/2022 | Schelfaut ................. F02C 7/20 |

* cited by examiner

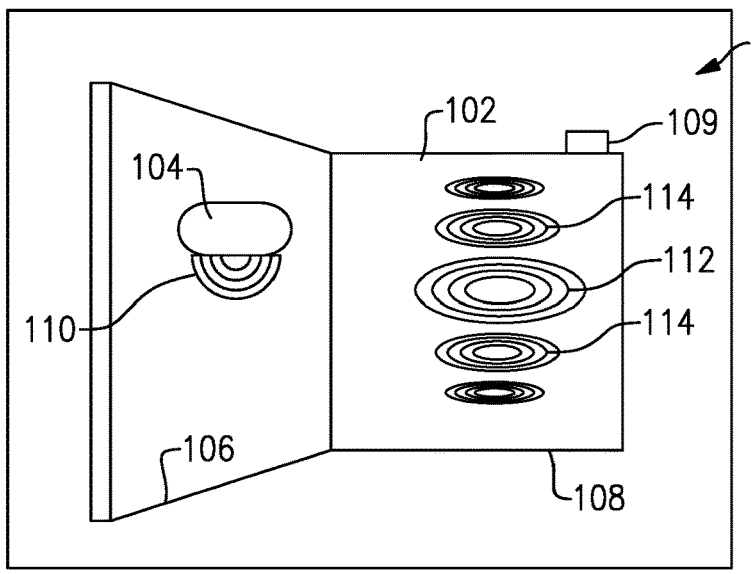
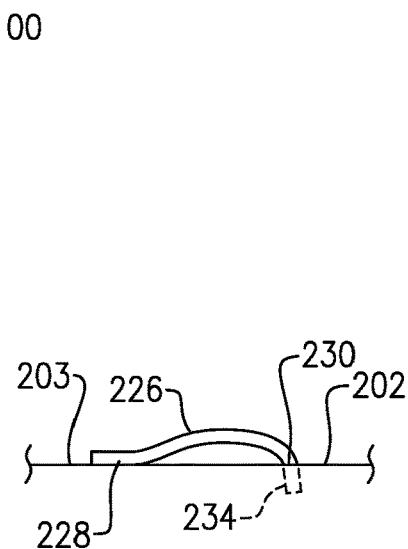
FIG.2
FIG.4B
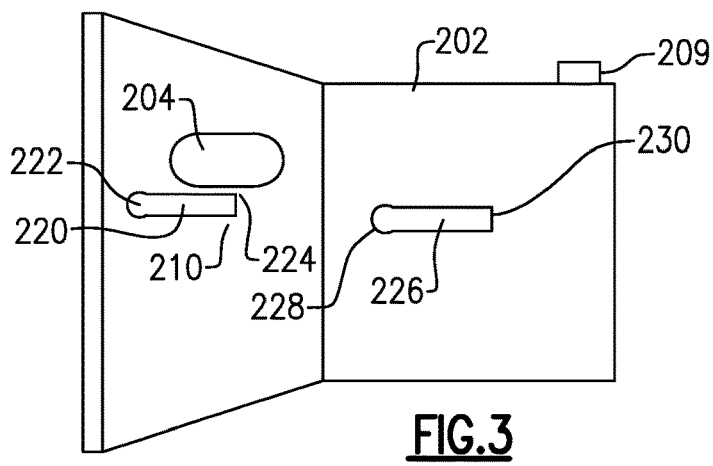
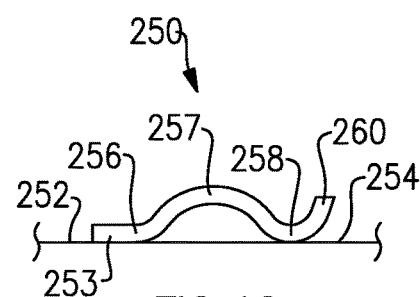
FIG.3
FIG.4C
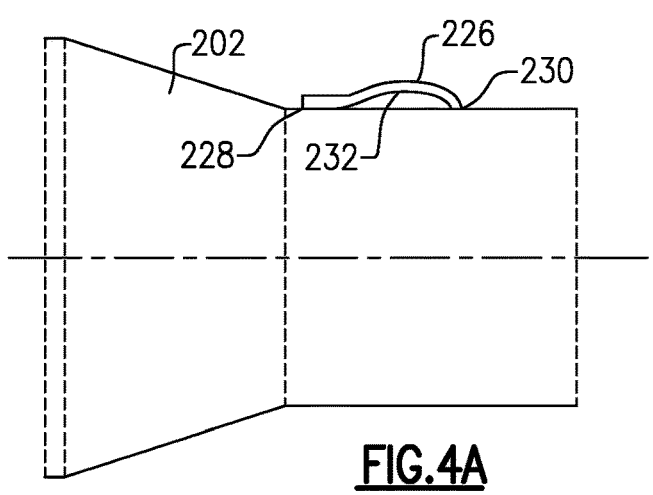
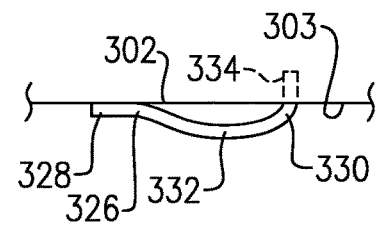
FIG.4A
FIG.5 ial position on the casing 102. Known
LOCAL VIBRATION DAMPING FOR GAS TURBINE ENGINE HOUSING

BACKGROUND

This application is related to local damping of vibrations in a gas turbine engine housing.

Gas turbines are known, and typically include a propulsor delivering air into a core engine. The core engine may include a compressor section for compressing the air and delivering it into a combustor. The air is mixed with fuel and ignited in the combustor. Products of this combustion pass downstream over turbine rotors driving them to rotate. The turbine rotors in turn drive compressor and propulsor rotors.

There are several housings in a typical gas turbine engine. One such housing is an inter compressor casing. The inter compressor casing may be located between a high pressure compressor and a low pressure compressor. Typically the inter compressor casing is formed of sheet metal which is welded to form a full hoop structure. There may be several cutouts in the sheet metal wall to provide access to internal components or for maintenance purposes.

Further, accessories may be mounted to the inter compressor casing.

In practice, the inter compressor casing may have a number of locations that raise vibration concerns at speeds within the engine speed running range. There are many nodal diameter modes that may have modal interference within the engine speed range. That is, the inter compressor casing may get excited and vibrate by the rotation of the rotor(s).

SUMMARY

A gas turbine engine includes a compressor section, a combustor and a turbine section. At least one casing surrounds at least one of the compressor and turbine section. The at least one casing is formed of sheet metal. The at least one casing has at least one potential peak displacement point due to vibration across a speed range of the one of the compressor and turbine section. A damper is placed on a wall of the casing at the at least one potential peak displacement point. The damper has one end fixed to the casing, and a second end not fixed to the casing and the second end provides an interference fit such that the second end cannot move to a relaxed position of the second end due to the wall of the casing.

A method of providing a casing for a gas turbine engine includes 1) modeling a casing design for a casing to be formed of sheet metal, 2) determining at least one peak displacement points based upon the modeling of step 1) and 3) providing a damper at the at least one peak displacement point, the damper having one end fixed to a wall of the casing and a second end which is not fixed to the wall of the casing and having a relaxed position that it cannot reach due to the wall of the casing.

These and other features will be best understood from the following drawings and specification, the following is a brief description.

BRIEF DESCRIPTION OF THE DRAWINGS

FIG. 2 simulates a modeling of a casing for a gas turbine engine.

FIG. 3 shows a resulting casing with local damping mechanisms designed based upon the model of FIG. 2.

FIG. 4A shows a first embodiment damper.

FIG. 4B shows a feature of the first embodiment damper.

FIG. 4C shows another embodiment.

FIG. 5 shows a second embodiment damper.

DETAILED DESCRIPTION

Figure 1:
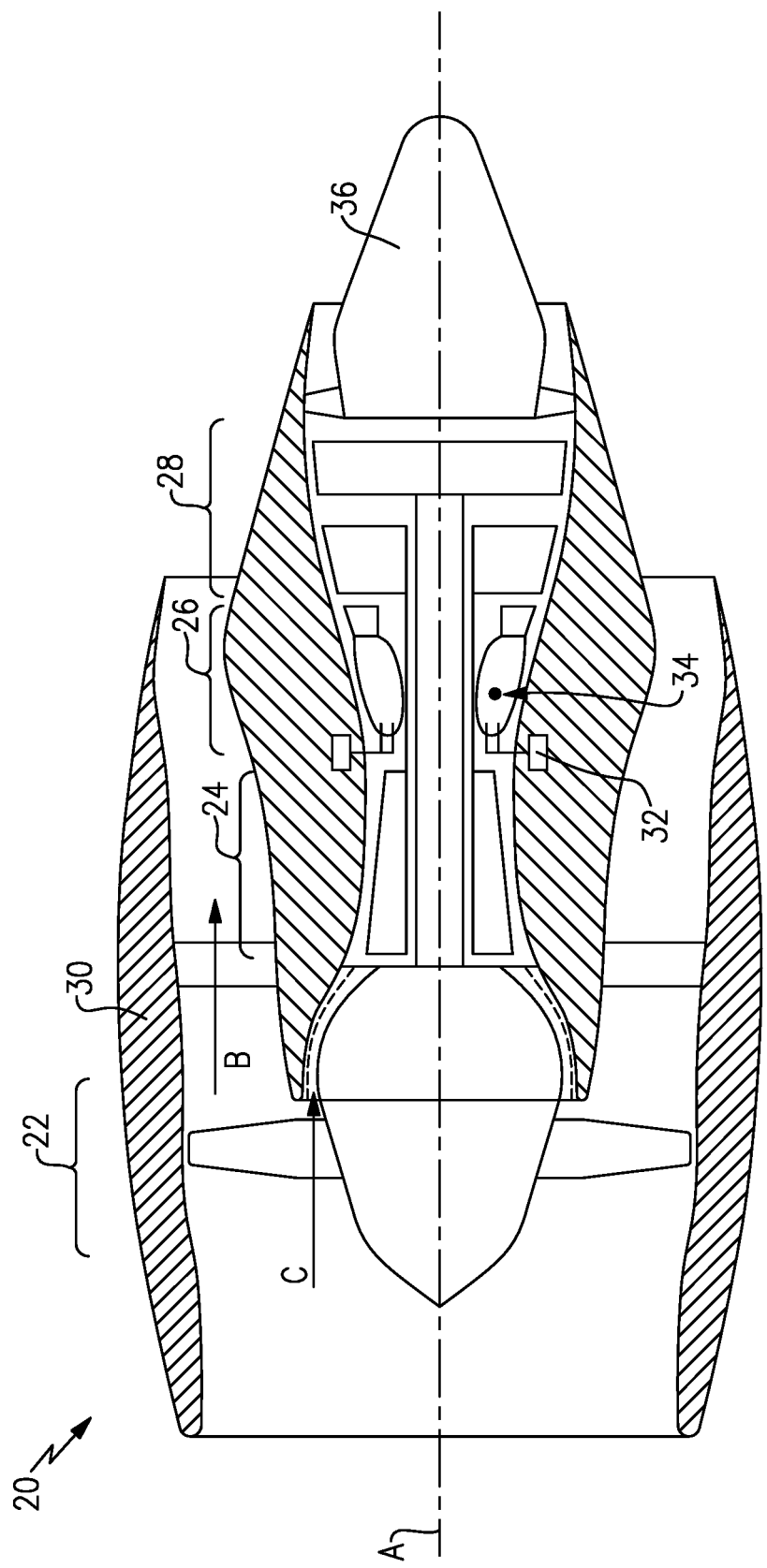
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

FIG. 2 schematically illustrates a computer 100 modeling a design for a casing 102 which may be an inter compressor casing for a gas turbine engine such as that shown in FIG. 1. However, the casing could be in locations other than the compressor, and may be utilized in other type engines.

The casing 102 is formed of thin sheet metal, and provided with cutouts 104. The casing 102 is shown to have a relatively large conical portion 106 merging into a relatively smaller diameter cylindrical portion 108. An accessory 109 is shown mounted on the casing 102. The accessory can be any number of components which may be utilized with the gas turbine engine. As examples, the accessory could be sensors, fuel or oil system effectors, tanks, or any number of other accessories.

A location of a peak displacement point 110 due to predicted vibration is determined by the modeling through known techniques. As shown, peak location 110 is adjacent the cutout 104. Further, other displacement locations 112 and 114 are illustrated. Area 112 may be the peak displacement at that axial position on the casing 102. Known modeling techniques may be utilized to develop the locations of peak displacement based upon things such as the expected rotor speeds within the engine, the thickness of the sheet metal, etc.

As shown in FIG. 3, a damper 220 is attached to the casing 202 at the location of the peak displacement 210. The damper 220 may be formed of the same metal as the sheet metal casing 202, or other appropriate metals. Damper 220 is connected at one end 222 to the casing 202 such as by a bolt, a rivet, a weld and/or brazing.

Another damper 226 is associated with the location 212 of peak displacement. Again, one end of damper 226 is fixed at 228 to the casing 202.

Ends 224 and 230 of the respective dampers 220 and 226 are not fixed with the casing 202. Rather, they have an interference fit.

FIG. 4A shows the damper 226 fixed to an outer surface 203 of the casing 202. There is a bowed portion 232 between ends 228 and 230. End 230 provides an interfit on an outer wall of the casing 202.

Thus, as shown in FIG. 4B, the end 230 would have a relaxed position 234 shown in phantom which would extend to a smaller inner diameter than is allowed by the casing 202. In this manner, there is a bias force supplied by the end 230 to the outer wall of the casing 202. This will dampen the displacement at the area 212.

The damper 220 operates in a similar manner.

FIG. 4C shows another embodiment 250. Embodiment 250 has a casing 252 with an outer wall 254 receiving a damper 253. Damper 253 has one end 256 which is fixed to casing 252. A central bowed portion 257 extends away from the outer wall 254 and bends back into a contacting portion 258, and then extends away from the outer wall 254 to an end 260. Again, when damper 253 is fixed to the casing 252 the contact portion 258 is forced away from its relaxed position such that it is biased against the outer wall 254.

FIG. 5 shows an embodiment housing casing 302 having a damper 326 fixed at end 328. There is a bowed portion 332 and the interference end 330 which is not fixed to the casing 302. This operates in a manner similar to the FIG. 3 embodiment. However, the FIG. 5 embodiment is on an inner surface 303 of the casing 302. Thus, a relaxed position 334 of end 330 is shown in phantom outward of the casing 302. As with the embodiments of FIGS. 4A-4C the FIG. 5 location could have other configurations.

Figure 6:
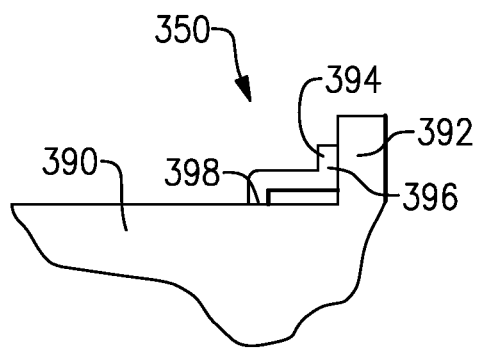
FIG. 6 shows yet another damper mount location.

FIG. 6 shows an embodiment 350 wherein casing 390 has a flange 392. In this embodiment there is a peak displacement location adjacent flange 392. A damper 394 is fixed at an end 396 to the flange 392. A remote free end 398 provides the damper function as described above. Note the flange 392 may be circumferentially continuous, or there may be one or more circumferentially spaced portions. The damper 394 may be structured as in any of the above embodiments.

Figure 7:
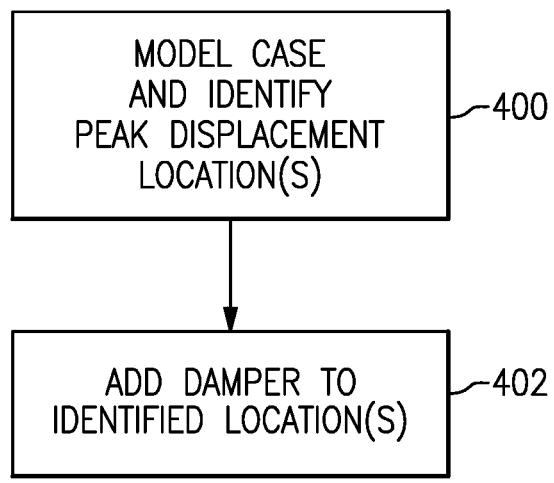
FIG. 7 shows a flow chart for a method according to this disclosure.

FIG. 7 is a flow chart for a method according to this disclosure. In a step 400 a casing is modeled with assistance of a computer to identify peak displacement locations. Dampers are then designed and added to the actual casing at step 402.

A gas turbine engine under this disclosure could be said to include a compressor section 24, a combustor 26 and a turbine section 28. At least one casing 202/252/302 surrounds at least one of the compressor and turbine section. The at least one casing is formed of sheet metal. The at least one casing has at least one potential peak displacement point due to vibration across a speed range of the one of the compressor and turbine section. A damper 220/226/253/326 is placed on the casing at the at least one potential peak displacement point. The damper has one end fixed to the casing, and a second end not fixed to the casing and the second end provides an interference fit such that the second end cannot move to a relaxed position of the second end due to the wall of the casing.

In another embodiment according to the previous embodiment, there are a plurality of potential peak displacement points at distinct locations and a plurality of the dampers.

In another embodiment according to any of the previous embodiments, the wall is an outer surface of the casing and the second end 230/258 of the damper is held at a greater outer diameter than the relaxed position due to the outer surface of the casing.

In another embodiment according to any of the previous embodiments, the wall is an inner surface of the casing and the second end 330 of the damper is held at a smaller outer diameter than the relaxed position due to the inner surface of the casing.

In another embodiment according to any of the previous embodiments, the damper has the one end fixed to a flange on the casing.

In another embodiment according to any of the previous embodiments, there is a cutout 104/204 through the wall of the casing and the at least one peak displacement is adjacent the cutout.

In another embodiment according to any of the previous embodiments, the casing has a conical section 106 and a smaller diameter cylindrical portion 102.

In another embodiment according to any of the previous embodiments, the cutout is in the conical portion.

In another embodiment according to any of the previous embodiments, the damper is formed of sheet metal.

In another embodiment according to any of the previous embodiments, the damper has a bowed portion between the one end and the second end.

A method of providing a casing for a gas turbine engine under this disclosure could be said to include 1) modeling 400 a casing design for a casing to be formed of sheet metal, 2) determining at least one peak displacement points based upon the modeling of step 1) and 3) providing a damper 402 at the at least one peak displacement point, the damper having one end fixed to a wall of the casing and a second end which is not fixed to the wall of the casing and having a relaxed position that it cannot reach due to the wall of the casing.

In another embodiment according to any of the previous embodiments, there are a plurality of peak displacement points at distinct locations and a plurality of the dampers.

In another embodiment according to any of the previous embodiments, the wall is an outer surface of the casing and the second end of the damper is held at a greater outer diameter than the relaxed position due to the outer surface of the casing.

In another embodiment according to any of the previous embodiments, the wall is an inner surface of the casing and the second end of the damper is held at a smaller outer diameter than the relaxed position due to the inner surface of the casing.

In another embodiment according to any of the previous embodiments, the damper has the one end fixed to a flange on the casing.

In another embodiment according to any of the previous embodiments, there is a cutout through the wall of the casing and the at least one peak displacement is adjacent the cutout.

In another embodiment according to any of the previous embodiments, the casing has a conical section and a smaller diameter cylindrical portion.

In another embodiment according to any of the previous embodiments, the cutout is in the conical portion.

In another embodiment according to any of the previous embodiments, the damper is formed of sheet metal.

In another embodiment according to any of the previous embodiments, the damper has a bowed portion between the one end and the second end.

Although embodiments have been disclosed, a worker of skill in this art would recognize that modifications would come within the scope of this disclosure. For that reason, the following claims should be studied to determine the true scope and content.

What is claimed is:

1. A method of providing a casing for a gas turbine engine comprising the steps of:

1) modeling a casing design for the casing to be formed of sheet metal;
2) determining peak displacement points based upon the modeling of step 1); and
3) providing a damper at at least one of the peak displacement points, the damper having one end fixed to a wall of the casing and a second end which is not fixed to the wall of the casing and having a relaxed position that it cannot reach due to the wall of the casing.

2. The method as set forth in claim 1, wherein there are a plurality of the peak displacement points at distinct locations and the damper is one of a plurality of dampers.

3. The method as set forth in claim 1, wherein the one end is fixed to an outer surface of the casing and the second end of the damper is held at a greater outer diameter than the relaxed position due to the outer surface of the casing.

4. The method as set forth in claim 1, wherein the one end is fixed to an inner surface of the casing and the second end of the damper is held at a smaller outer diameter than the relaxed position due to the inner surface of the casing.

5. The method as set forth in claim 1, wherein the damper has the one end fixed to a flange on the casing.

6. The method as set forth in claim 1, wherein there is a cutout through the wall of the casing and the at least one peak displacement point is adjacent the cutout.

7. The method as set forth in claim 6, wherein the casing has a conical section and a smaller diameter cylindrical portion.

8. The method as set forth in claim 7, wherein the cutout is in the conical portion.

9. The method as set forth in claim 1, wherein the damper is formed of sheet metal.

10. The method as set forth in claim 1, wherein the damper has a bowed portion between the one end and the second end.

* * * * *